(12) United States Patent
Restaino et al.

(10) Patent No.: US 8,907,260 B2
(45) Date of Patent: Dec. 9, 2014

(54) EXTENDED SOURCE WAVEFRONT SENSOR THROUGH OPTICAL CORRELATION WITH A CHANGE IN CENTROID POSITION OF LIGHT CORRESPONDING TO A MAGNITUDE OF TIP/TILT ABERRATION OF OPTICAL JITTER

(75) Inventors: Sergio R. Restaino, Albuquerque, NM (US); Scott W. Teare, Poluadera, NM (US); Jonathan R. Andrews, Albuquerque, NM (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 438 days.

(21) Appl. No.: 13/482,304

(22) Filed: May 29, 2012

(65) Prior Publication Data

US 2012/0242831 A1   Sep. 27, 2012

Related U.S. Application Data

(63) Continuation-in-part of application No. 13/351,821, filed on Jan. 17, 2012, now abandoned.

(60) Provisional application No. 61/432,752, filed on Jan. 14, 2011.

(51) Int. Cl.
*G01J 1/20* (2006.01)
*G06K 9/74* (2006.01)
*G01J 9/00* (2006.01)
*G02B 26/06* (2006.01)

(52) U.S. Cl.
CPC . *G06K 9/741* (2013.01); *G01J 9/00* (2013.01); *G02B 26/06* (2013.01)
USPC .................................... 250/201.9; 250/208.1

(58) Field of Classification Search
USPC .......... 250/201.9, 208.1, 214 VT, 216, 214.1; 356/121, 488, 489, 451; 359/10, 11, 359/16, 555–557
See application file for complete search history.

(56) References Cited

U.S. PATENT DOCUMENTS 5,090,016 A     2/1992   Dewhirst et al.
5,377,211 A    12/1994   Kong et al.

(Continued)

OTHER PUBLICATIONS

Shack-Hartmann Wavefront Sensors, Thorlabs Light Analysis Catalog, pp. 1610-1613, retrieved from the internet <<www.thorlabs.com/dsp_CatalogDownload2.cfm?id=57>> [retrieved on Feb. 28, 2012].

(Continued)

*Primary Examiner* — Que T Le
(74) *Attorney, Agent, or Firm* — US Naval Research Laboratory; Sally A. Ferrett

(57) ABSTRACT

An atmospheric aberration sensor that uses two optically correlated images of a scene and the Fourier transform capabilities of a lens or other focusing element. The sensor receives light via an f-number matching element from a scene or from an external optical system and transmits it through a focusing optical element to an updateable display element such as a spatial light modulator or micro mirror array, which modulates the real time image from the focusing element with previous template image of the same extended scene. The modulated image is focused onto an autocorrelation detection sensor, which detects a change in centroid position corresponding to a change of the tip/tilt in the optical path. This peak shift is detected by centroid detection and corresponds to the magnitude of global wavefront tip/tilt. With a lenslet array and detector array, the system can also measure local tip/tilt and higher order aberrations.

22 Claims, 3 Drawing Sheets

(56) References Cited

U.S. PATENT DOCUMENTS

| | | | |
|---|---|---|---|
| 6,151,337 | A | 11/2000 | Carlsten et al. |
| 6,674,519 | B2 * | 1/2004 | Mui .............................. 356/121 |
| 7,286,283 | B2 | 10/2007 | Starodoumov |
| 7,331,674 | B2 | 2/2008 | Dai |
| 7,554,672 | B2 | 6/2009 | Greenaway et al. |
| 7,748,848 | B2 | 7/2010 | Dai |
| 7,764,417 | B1 | 7/2010 | Chang et al. |
| 8,009,280 | B1 | 8/2011 | Erry et al. |
| 8,022,345 | B1 | 9/2011 | Chang et al. |
| 2010/0192709 | A1 | 8/2010 | Wilcox et al. |

OTHER PUBLICATIONS

Teare, S.W., Restaino, S.R., "Introduction to Image Stabilization", SPIE Press, Tutorial Text TT73, Sep. 2006, chapters 1-3 (pp. 1-38).

Zilberman, A., Golbraikh, E., Kopecki, N.S., "Propagation of electromagnetic waves in Kolmogorov and non-Kolmogorov atmospheric turbulence: three layer altitude model", Applied Optics, vol. 47, No. 34, pp. 6386-6391, Dec. 1, 2008.

Wilcox, C.C., Andrews, J.R., Restaino, S.R., Martinez, T., Teare, S.W., "Atmospheric Turbulence Generator Using a Liquid Crystal Spatial Light Modulator", Proceedings of the IEEE 2007 Aerospace Conference, pp. 1-8, conference date Mar. 3-10, 2007.

Wilcox, C.C., Martinez, T., Santiago, F., Andrews, J.R., Restaino, S.R., Teare, S.W., Payne, D., "Atmospheric Turbulence Generator for Adaptive Optical Systems Testing", Advanced Wavefront Control: Methods, Devices, and Applications V, Proc. SPIE, pp. 67110D-1-67110D-9, Sep. 2007.

Ten Brummelaar, T.A., "The contribution of high order Zernike modes to wavefront tilt", Optics Communications, vol. 115, pp. 417-424, Apr. 1, 1995.

Santiago, F., Wilcox, C., Chang, M., Font, C., Roura, E., Restaino, S., "Low altitude horizontal scintillation measurements of atmospheric turbulence over the sea: Experimental Results", Active and Passive Optical Components for WDM Communications V, Proc. SPIE, vol. 6014, pp. 321-329, Oct. 24, 2005.

Wilcox, C.C., Martinez, T., Santiago, F., Andrews, J.R., Restaino, S.R., Teare, S.W., Payne, D., "Atmospheric Turbulence Generator for Testing Adaptive Optical Systems ", Proc. SPIE, vol. 7015, pp. 701542-1-701542-9, conference date Jun. 23, 2008; online publication date: Aug. 12, 2008.

Wang, J.Y., Markey, J.K., "Modal compensation of atmospheric phase distortion", J. Opt. Soc. Am., vol. 68, No. 1, pp. 78-87, Jan. 1978.

Noll, R.J., "Zernike polynomials and atmospheric turbulence", J. Opt. Soc. Am., vol. 66, No. 3, pp. 207-211, Mar. 1976.

Fried, D.L., "Optical Resolution Through a Randomly Inhomogeneous Medium for Very Long and Very Short Exposures", J. Opt. Soc. Am., vol. 56, No. 10, pp. 1372-1379, Oct. 1966.

Miura,N. et al., "Performance of Software-Based Solar Adaptive Optics System", Optical Review, vol. 14, No. 3, pp. 159-160, 2007.

Toyoda, M., Araki, K., Suzuki, Y., "Wave-front tilt sensor with two quadrant detectors and its application to a laser beam pointing system", Applied Optics, vol. 41, No. 12, pp. 2219-2223, Apr. 2002.

Andrews, J.R., Martinez, T., Wilcox, C.C., Restaino, S.R.,Teare, S.W., Payne, D.M., "Modular Adaptive Optics Testbed for NPOI", Advanced Maui Optical and Space Surveillance Techologies (AMOS) Conference, p. E56, 6 pages, presented Sep. 2006.

Schmidt, J.D., Whiteley, M.R., Goda, M.E., Duncan, B.D., "High-resolution liquid crystal spatial light modulators for adaptive optics", 2006 IEEE Aerospace Conference, IEEEAC paper # 1367, 10 pages, 2006.

Roddier, C. Roddier, F., "Interferogram analysis using Fourier transform techniques", Applied Optics, vol. 26, No. 9, pp. 1668-1673, May 1987.

Restaino, S.R., Andrews, J.R., Martinez, T., Wilcox, C.C., Santiago, F., Payne., D.M., Teare, S.W., "MEMS Adaptive Optics for Horizontal Turbulence Correction", Proc. SPIE, MEMS Adaptive Optics V, Photonics West, vol. 7931, pp. 793105-1-793105-7, published Mar. 26, 2011, conference dates Jan. 23-27, 2011.

Platt, B.C., Shack, R., "History and Principles of Shack-Hartmann Wavefront Sensing", Journal of Refractive Surgery, vol. 17, pp. S573-S577, Sep./Oct. 2001.

* cited by examiner

EXTENDED SOURCE WAVEFRONT SENSOR THROUGH OPTICAL CORRELATION WITH A CHANGE IN CENTROID POSITION OF LIGHT CORRESPONDING TO A MAGNITUDE OF TIP/TILT ABERRATION OF OPTICAL JITTER

CROSS-REFERENCE TO RELATED APPLICATIONS

This application is a continuation in part of U.S. application Ser. No. 13/351,821, filed on Jan. 17, 2012, which is a non-provisional under 35 USC 119(e) of and claims the benefit of U.S. Provisional Application 61/432,752 filed on Jan. 14, 2011. The entire disclosure of each of these references is incorporated herein by reference.

BACKGROUND

1. Technical Field

The invention is related to the field of optics, and more specifically, to the field of adaptive optics, active optics, platform and image stabilization for extended source applications such as astronomical, terrestrial, marine, space imaging systems.

2. Related Technology

Adaptive and active optics systems are intended to measure and compensate, in near real time, aberrations introduced in an optical wavefront as it passes through a medium, or from jitter induced by motion in a platform. In these systems, a wavefront sensor is employed to measure the phase front of light. These phase measurements provide information about the phase front that are attributable to the medium and can be used with deformable optics to correct or minimize the wavefront aberrations. Wavefront sensors can measure both static and dynamic aberrations. There are a variety of wavefront sensors, including interferometric sensors, lenslet arrays and wavefront curvature sensors, but they are not well suited to operate with extended sources and are typically used for point sources only.

A Shack-Hartmann wavefront sensor is a specific type of wavefront sensing that employs an array of lenslets to break the wavefront into small pieces and measure local tilt of a wavefront. The development of Shack-Hartmann sensors is described in Platt, B. C., Shack, R., "History and Principals of Shack-Hartmann Wavefront Sensing", Journal of Refractive Surgery, Vol. 17, September/November 2001, pp. S573-S577.

A phase-diversity or curvature wavefront sensor measures the curvature of a wavefront by measuring intensity differences of the light at two planes and then calculates the wavefront phase. U.S. Pat. No. 7,554,672 to Greenaway et al. discloses an example of a phase-diversity wavefront sensor.

Other methods for measuring and correcting for wavefront aberrations are described in S. W. Teare and S. R. Restaino, Introduction to Image Stabilization, SPIE Press, Tutorial Texts in Optical Engineering, 2006 and in John W. Hardy, Adoptive Optics for Astronomical Telescopes, Oxford University Press, 1998.

BRIEF SUMMARY OF THE DISCLOSURE

An aspect of the invention is directed to a wavefront sensing system for estimating tip/tilt changes in a wavefront generated by an extended source and propagated along an optical path through a turbulent medium or due to mechanical jitter in an optical platform. The system includes an f-number matching element and a beamsplitter that shares an image of the extended source onto both an updateable display element and an updateable imaging sensor. The updateable imaging sensor records a time exposure of the extended source and, through an information processor, the image is transferred to the updateable display element as desired. The optical energy imaged on the updateable display element modulates the optical energy of the updated image. A focusing optical element relays the modulated optical energy from the updateable display element onto an autocorrelation detection sensor. The autocorrelation detection sensor is located at the focal point of the focusing optical element, and measures a change in centroid position of the optical energy, wherein a change in a centroid position corresponds to a change of the tip/tilt in the wavefront from the extended source.

The f-number matching element is a focusing element that optimizes the amount of optical energy being accepted for the autocorrelation analysis.

The beamsplitter is an element that shares light between the two optical paths in the autocorrelation system with many transmission/reflection sharing ratios being possible.

The updateable imaging element can be a digital camera, for example, a charge-coupled device camera, complementary metal oxide semiconductor camera, an ultraviolet, visible, or infrared focal plane array or any other analog, digital or other style of imaging sensor that is capable of sampling electromagnetic energy. The autocorrelation detection sensor can be a position sensitive detector, quadrant detector, or an array of detectors that measures motion of one or multiple focal spots.

The information processor is any analog or digital processing system for recording images, updating displays, analyzing data or controlling other instrumentation. The information processor also provides a human-machine interface or machine-machine interface.

The focusing optical element transfers optical energy to the autocorrelation detection sensor. The focusing optical element is aligned so the central peak of light intensity will fall at the center of the autocorrelation detection sensor when there is no difference between an exposed image applied to the updateable display element and the optical energy passing through the updateable display element.

The autocorrelation detection sensor is a detector that detects displacement of optical energy and can be a quad cell, a quadrant detector, a focal plane array, or an imaging array.

BRIEF DESCRIPTION OF THE DRAWING FIGURES

DETAILED DESCRIPTION OF THE DISCLOSURE

The principle of this patent is embodied as an extended source wavefront sensing system that uses two optically correlated images of a scene and the Fourier transform capabilities of a focusing optical element. Optical energy from a scene is modulated by a previously recorded image of the scene and their autocorrelation is thus measured. As time evolves, any changes in the scene, platform position or the media that the optical energy passes through, will result in a changes in the incoming optical energy with respect to the previously recorded image and be observed in the autocorrelation. The autocorrelation is measured as a displacement on the autocorrelation detection sensor. Changes in the global tip and tilt, or higher order aberrations, of the light energy entering the system will cause a shift in the central peak of the light on the autocorrelation detection sensor. This peak shift can be detected by centroid detection or other means, and will indicate the wavefront tip/tilt or higher order modes of the aberration from the wavefront of the incoming extended source scene.

Figure 1:
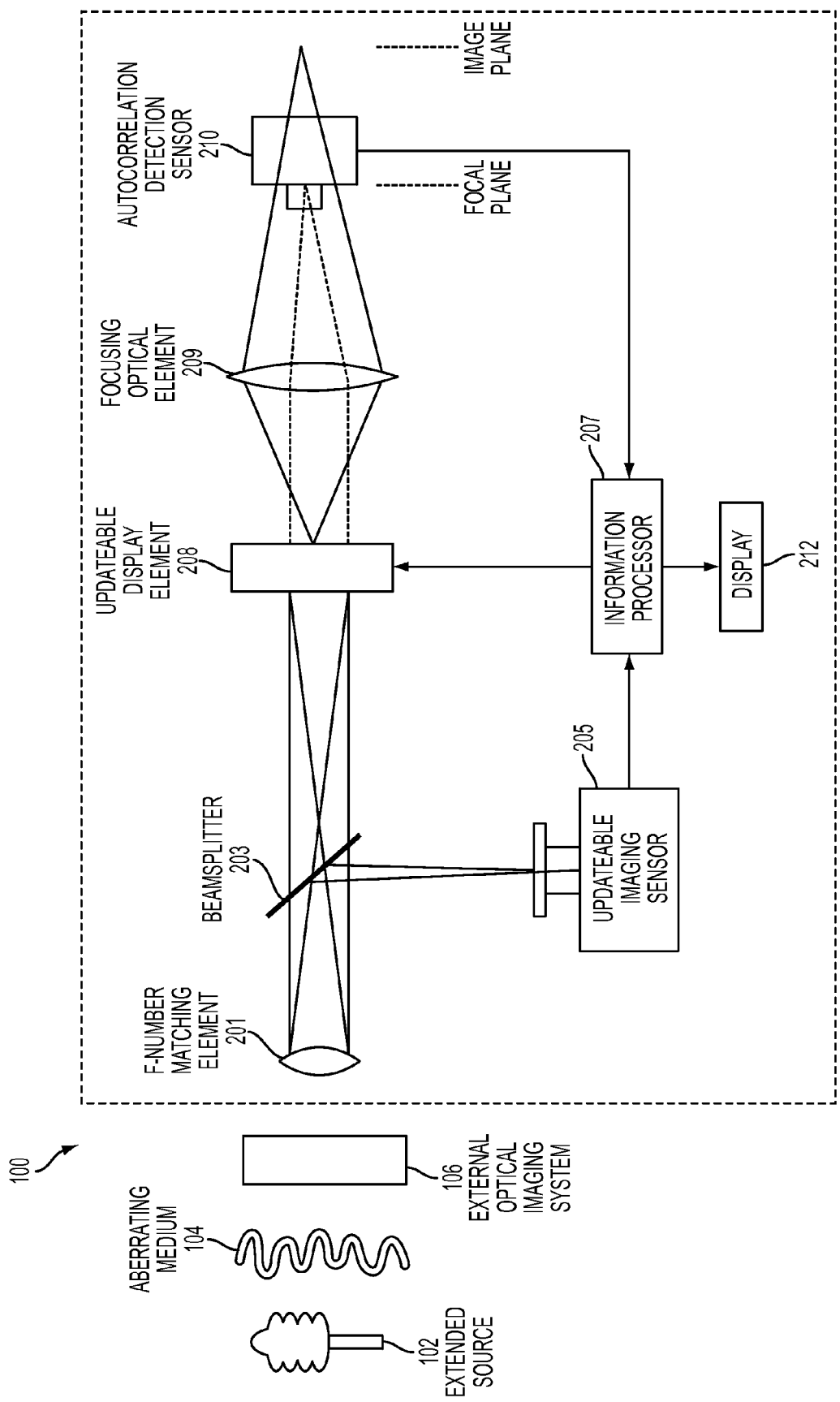
FIG. 1 illustrates a wavefront sensor in accordance with an embodiment of the invention.

FIG. 1 shows an exemplary embodiment of an extended source wavefront sensing system 100. Optical energy from an extended object 102 passes through an aberrating medium 104, through any external optical imaging system 106 and arrives at the f-number matching element 201. The optical energy collected by the f-number matching element 201 focuses the optical energy onto an updateable display element 208 and an updateable imaging sensor 205 using a partially reflective, partially transmitting beamsplitter 203 in the optical path. The updateable imaging sensor 205 records a reference image of the object 102 plus the effects of being transmitted through the aberrating medium 104 and external optical imaging system 106. At time $t_1$, an information processor 207 transfers the reference image from the updateable imaging sensor 205 onto the updateable display element 208. At a time $t_2$, the reference image is unchanged, however, the optical energy transmitted through the system has continued to evolve and the optical energy passing through the updateable display element 208 is modulated. The optical focusing element 209 provides an autocorrelation of the reference image with the optical energy transmitted through the system such that an autocorrelation detection sensor 210 placed at the focal point of the focusing optical element 209 detects changes in displacement of the optical energy. At some time later $t_3$, the reference image is updated and the process restarts.

Figure 2:
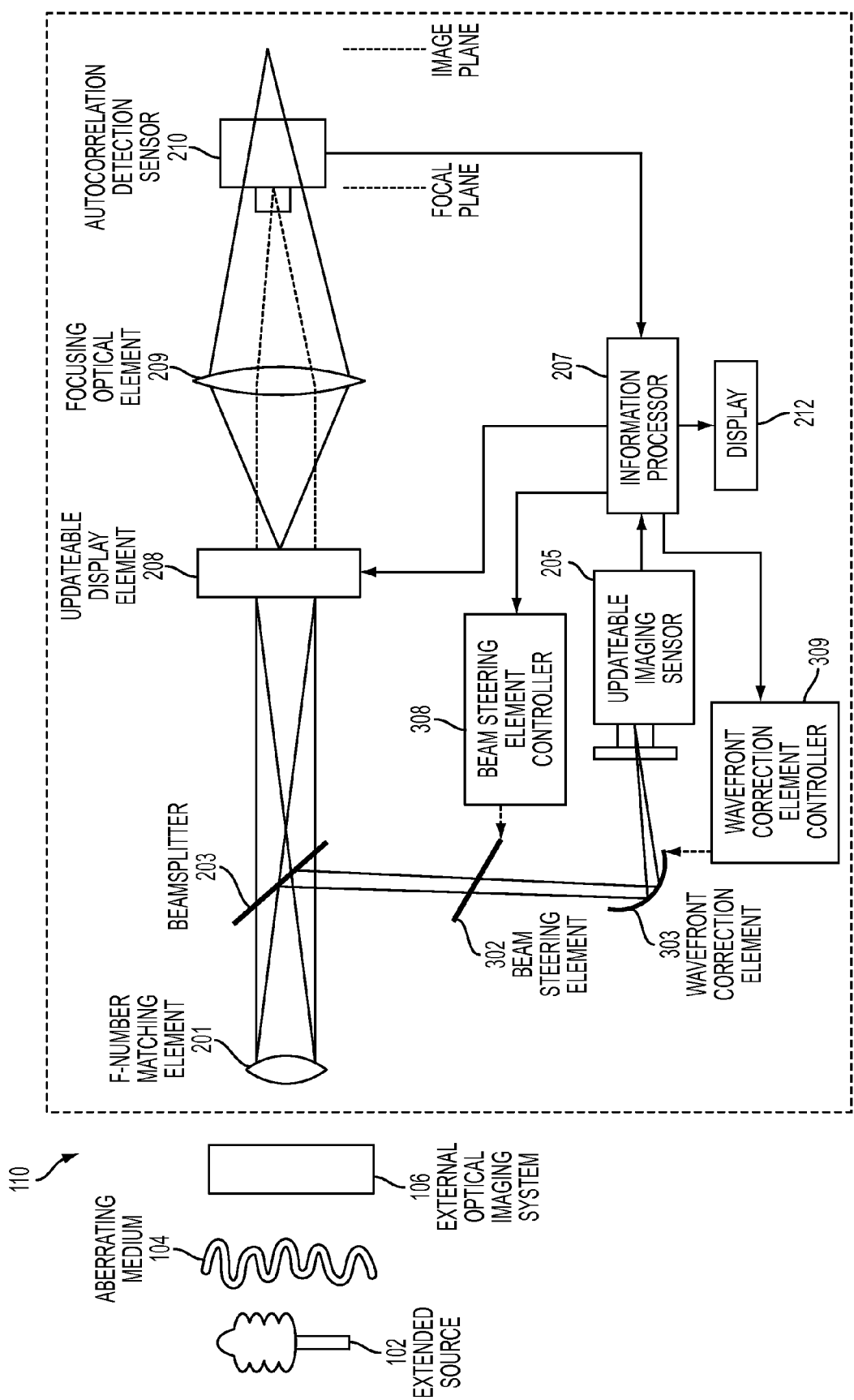
FIG. 2 illustrates a wavefront sensor in accordance with an embodiment of the invention with additional features.

FIG. 2 shows a realization of the autocorrelation wavefront sensor demonstrated in FIG. 1 with the added feature of wavefront correction. This is shown in FIG. 2 as item 110, which includes both a beam steering element 302 and a wavefront correction element 303 in the optical path between the beamsplitter 203 and the updateable imaging sensor 205. The information processor 207 determines the necessary corrections based on the displacement information from autocorrelation detection sensor 210, and applies the corrections to the beam steering element 302 and the wavefront correction element 303 via controllers 308, 309. The corrected scene can be displayed on the computer display 212, displayed on a different display, stored for future use, or transmitted for further processing by another optical or information processing device.

Figure 3:
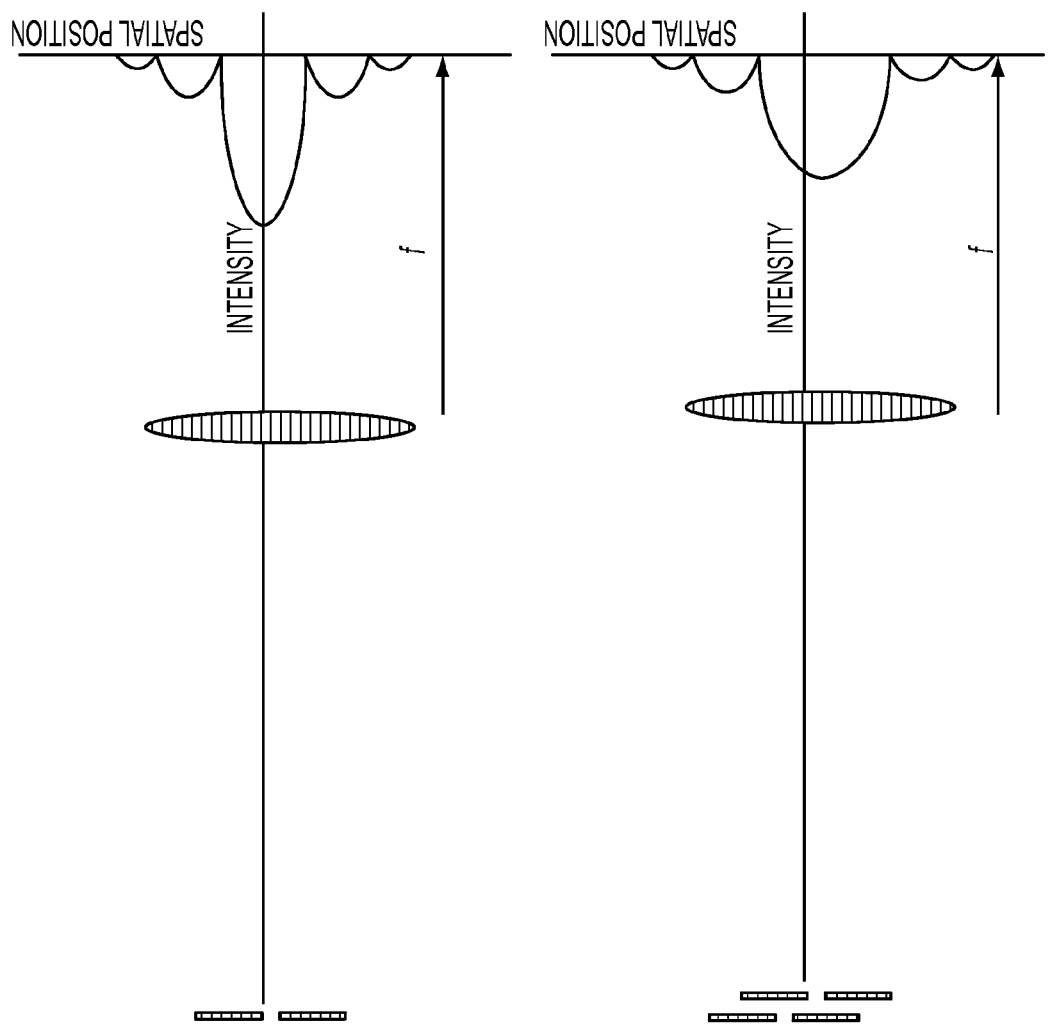
FIG. 3 illustrates the difference between image planes and focal planes and demonstrates the autocorrelation effect.

FIG. 3 describes how the autocorrelation is formed by a focusing optical element from changes in the extended scene. As demonstrated in the Abbe-Porter experiments (Porter A. B., *Phil. Mag.* (6) 11 (1906) and Abbe E, *Archiv. Mikroskopishe Anat.* 9 (1873)) a focusing optical element will form an image of an object positioned a finite distance from it (more than one focal length) in the image plane of the focusing optical element. However, in the focal plane, which is located between the lens (one focal length away) and the image plane, the focusing optical element forms the Fourier spectrum of the object. When two objects are superimposed n the same plane the focusing optical element will form an image of the two objects, but in the focal plane, the focusing optical element will form the product of the two Fourier spectra. Such product is mathematically equivalent to the cross-correlation of the two objects. If the object is the same, but slightly displaced, then the cross-correlation is an autocorrelation and any displacement of the object with respect to itself, as the template object, will result in the shifting of the central peak of the autocorrelation. This is demonstrated in FIG. 3 using a lens as the focusing optical element. A more complex extended source or scene will result in a more complicated Fourier spectra to be analyzed.

The f-number matching element 201 can be a single lens, an aperture, a more complex system with multiple focusing elements, or the receiving optical component of any of the systems mentioned above that is capable of receiving optical energy.

By f-number matching, it is meant that element is preferably configured to match the f-number of the system to that of the optics or lack of optics in front of the system. For example, a lens of a different size might be put in place to focus the image of a nearer object onto the updateable display element. In its simplest form the f-number matching element is a lens. It could also be a minor, a graded index lens, a diffractive optic etc. The lens has the special purpose of collecting the light from the scene and providing the correct f-number and scaling to the updateable display element (which could be an SLM). In the case were the f-number matching element is a lens, it provides the correct magnification when focusing the light onto the updateable display element. In the case where there is a telescope (or camera lens) in front of the systems, the f-number matching element relays the focal point of the telescope onto the updateable display element or could intercept the light from the telescope and scale it.

The term "optical energy" is intended to encompass any electromagnetic energy wavelength that can be focused or collimated by the f-number matching element 201 and the focusing optical element 209 and imaged by the updateable imaging sensor 205. Examples of suitable updateable imaging sensors 205 include, but are not limited to, charge coupled device (CCD) sensors, complementary metal-oxide (CMOS) image sensors, quantum dot or quantum well detectors, bolometers, photomultipliers or Silicon Carbide Ultraviolet detectors. Suitable electromagnetic wavelengths can include ultraviolet, visible, X-ray, near IR, infrared, MIR, FIR, terahertz, microwave, and radio wavelengths.

The reference image is a recently captured image of the extended source 102 by the updateable imaging sensor 205 and information processor 207 that is transferred to the updateable display element 208 and used as a template. For example, the reference image can be the first image acquired by the updateable imaging sensor 205 at the beginning of operations. The information processor 207 transmits the reference image to the updateable display element 208 on demand. The transmission of the reference image can be event driven, for example, when the scene changes, can be done at a regularly timed interval, can be done at a random interval, or can be when selected by a user.

The information processor 207 controls the reference image on the updateable display element. The f-number matching element 201 continues to propagate optical energy in real time onto the updateable display element 208 where the template image is displayed and periodically updated. The information processor 207 can also include a user interface that allows a user to select when and/or how frequently to update the reference image or a machine-machine interface for automatic control, and performs the function of a controller.

The updateable display element 208 modulates the real-time image with the reference image as the wavefront passes through the updateable display element 208. After the reference image is captured by the updateable imaging sensor 205 and applied to the updateable display element 208, as the extended source 102 changes with respect to the template image, the transmitted image will be shifted with respect to the template image. Suitable updateable display elements 208 include liquid crystal display spatial light modulators manufactured by the Holoeye Corporation, headquartered in San Diego, Calif., as well as those from Boulder Non-Linear Systems, headquartered in Lafayette, Colo. Other spatial light modulators can also be suitable. Other suitable updateable display elements are those which can both transmit the real-time image through the element or reflect the image off of that element and simultaneously reproduce the template image on the element. Examples include projectors in which the template image is created by microscopically small mirrors laid out in a matrix on a semiconductor chip. Such projectors are commercially available from Texas Instruments, headquartered in Dallas, Tex., under the trade names DLP® and DIGITAL LIGHT PROCESSING®.

A focusing optical element 209 relays the optical energy to both a focal plane located at the focal point and to an image plane conjugate to the location of the updateable display element. The focusing optical element 209 focuses the optical energy and generates the autocorrelation of the real time image and the template image. A change in the real time image compared to the template image will cause changes in the shape of the autocorrelation profile.

The autocorrelation detection sensor 210 detects a change in the centroid location of the autocorrelation profile and provides a direct readout of the global tip/tilt signal caused by any static or dynamic aberrations present from the aberrating medium 104 or from optical platform jitter since the template image was acquired and updated on the updateable display element 208. The optical system is preferably aligned so that when there is no change in the real time image, the central peak of light intensity will fall at the center of the detector. The autocorrelation detection sensor 210 can be a quad cell, a quadrant detector, a focal plane array, or an imaging array.

The autocorrelation wavefront sensor 100 and 110 described herein can be a components of, or added to optical systems including telemetry systems, systems for measuring wind effects, systems for dynamic scanning of exit pupils, still camera stabilization, movie or film camera stabilization, hand-held video camera stabilization, image stabilized binoculars, image stabilized riflescopes, image stabilized cell phone cameras, image stabilized range finders, image stabilized telescopes, stabilized shipboard optics, stabilized shipboard periscopes, automated threat detection systems, target tracking systems, missile tracking systems, target identification systems, missile identification systems, air to air missiles, air to ground missiles, ground to air missiles, ground to space missiles, air to space missiles, space to air missiles, space to ground missiles, smart robotics, sub-aquatic remotely operated vehicles, torpedoes, and intelligence gathering systems.

The autocorrelation wavefront sensors 100 and 110 described herein have several beneficial features and advantages. For example, the wavefront sensors provide robust and compact measurement of a range of static and dynamic aberrations for extended sources. In addition, the sensors can provide both local tip/tilt and global tilt measurements. The sensors are computer driven, and allow both real-time image correction and post-processing image correction via software. The sensor system also can provide both LCD masking and fixed-scene masking.

The autocorrelation measured by the autocorrelation detection sensor 210 can be input to an adaptive optics system that corrects or stabilizes the real-time image to account for the displacement measured by the autocorrelation detection sensor 210. The adaptive optics system can include, for example, a controllable tip/tilt mirror, a higher order deformable minor, spatial light modulator, or other corrective optical elements. Adaptive optics techniques are used in free space laser communication systems, high-energy laser systems, and phase correction for deployable space-based telescopes and many other imaging systems. Inclusion of a beam steering element and/or a wavefront correction element between the beam sharing element and the imaging element, together with supporting optics, all of which being controlled by the output of the information processors, will permit images to be obtained using the updateable imaging sensor 205 or an additional imaging element. When used with a wavefront correction system, the focusing optical element 209 is a lenslet array and the autocorrelation detection sensor 210 is an imaging array. This system can provide local wavefront tip/tilt measurements for determining higher-order wavefront measurement and can be used with the beam steering element 302 and the wavefront correction element 303 via controllers 308, 309 to provide wavefront correction.

For each of these methods, the resolution of the image to be generated for the updateable display element 208 is set in the software for a particular model of updateable display element 208. The setting can be modified for different pixel resolutions of different spatial light modulators or number of corrector mirror channels, etc. Different versions of software can be stored for each model so that the appropriate resolution is used for the corresponding device, or the software can allow the user to select the model of updateable display element 208 and the software can adjust the number and location of the points accordingly.

Embodiments of the present invention may be described in the general context of computer code or machine-usable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, handheld devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer usable instructions form an interface to allow a computer to react according to a source of input. The instructions cooperate with other code segments to initiate a variety of tasks in response to data received in conjunction with the source of the received data.

Computing devices includes a bus that directly or indirectly couples the following elements: memory, one or more processors, one or more presentation components, input/output (I/O) ports, I/O components, and an illustrative power supply. Bus represents what may be one or more busses (such as an address bus, data bus, or combination thereof). One may consider a presentation component such as a display device to be an I/O component. Also, processors have memory. Categories such as "workstation," "server," "laptop," "hand held device," etc., as all are contemplated within the scope of the term "computing device."

Computing devices typically include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other tangible physical medium that can be used to encode desired information and be accessed by computing device.

Memory includes computer storage media in the form of volatile and/or nonvolatile memory. The memory may be removable, nonremovable, or a combination thereof. Exemplary hardware devices include solid state memory, hard drives, optical disc drives, and the like. A computing device includes one or more processors that read from various entities such as memory or I/O components. Presentation component can present data indications to a user or other device. Exemplary presentation components include a display device, speaker, printing component, vibrating component, and the like.

The instructions on the computing device can be written in any language capable of interfacing with the input/outport ports of the updateable imaging element.

I/O ports allow computing devices to be logically coupled to other devices including I/O components, some of which may be built in. Illustrative components include a microphone, joystick, game pad, satellite dish, scanner, printer, wireless device, etc.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. A wavefront sensing system for estimating tip-tilt or higher order wavefront aberrations in a wavefront of light passing through any aberration medium or aberrations induced from mechanical jitter in an optical system by auto-correllating a reference image of the scene and a real-time image of the scene, the system comprising:
    an f-number matching element arranged for receiving the light from a scene or external optical imaging element;
    an updateable imaging sensor for capturing the reference image;
    an updateable display element;
    a beam splitter arranged to transmit a first portion of the light to the updateable imaging sensor and a remaining portion of the light to the updateable display element;
    the updateable display element arranged to have the reference image applied thereto for a predetermined period of time;
    a focusing optical element;
    and an autocorrelation detection sensor arranged in the focal plane of the focusing optical element,
    wherein in operation, light from a extended source scene is passed to the updateable display element where it is focused onto the autocorrelation detection sensor from a focusing optical element forming thereon an autocorrelation of the scene information passing through the updateable display element with the information from a template image acquired from the extended scene such that a change in a centroid position of the light on the autocorrelation detection sensor corresponds to a magnitude of tip/tilt aberration in the aberrating medium and/or magnitude of optical jitter.

2. The wavefront sensing system of claim 1, wherein in operation, the light from an extended source scene has passed through an aberrating medium and external optical imaging system or onto an optical platform with some induced mechanical jitter, wherein the extended source scene is optically matched to the system using an f-number matching element.

3. The wavefront sensing system of claim 1, wherein a change in the centroid position corresponds to a magnitude of the tip/tilt aberration.

4. The wavefront sensing system of claim 1, wherein the magnitude of the tip/tilt aberration is passed to an adaptive optics system for wavefront correction.

5. The wavefront sensing system of claim 1, wherein the updateable imaging sensor is a digital imaging device.

6. The wavefront sensing system of claim 1, wherein the updateable imaging sensor is an analog imaging device.

7. The wavefront sensing system of claim 1, wherein the updateable imaging sensor is a charge-coupled device camera.

8. The wavefront sensing system of claim 1, wherein the updateable imaging sensor is a complementary metal oxide semiconductor camera.

9. The wavefront sensing system of claim 1, wherein the updateable imaging sensor is a detector capable of image acquisition in the visible wavelength band, X-ray band, Gamma-ray band, UV band, near infrared band, infrared band, mid-wave infrared band, long-wave infrared band, far infrared band, terahertz band, microwave band or radio band.

10. The wavefront sensing system of claim 1, wherein the optical energy is in a visible wavelength band, X-ray band, Gamma-ray band, UV band, near infrared band, infrared band, mid-wave infrared band, long-wave infrared band, far infrared band, terahertz band, microwave band or radio band.

11. The wavefront sensing system of claim 1, further comprising an information processor with instructions for generating an image representing the reference image and for inputting that image to the updateable imaging element.

12. The wavefront sensing system of claim 1, wherein the updateable imaging element is a spatial light modulator.

13. The wavefront sensing system of claim 1, wherein the updateable imaging element is a micro minor array.

14. The wavefront sensing system of claim 1, wherein the autocorrelation detection sensor is a quadrant detector.

15. The wavefront sensing system of claim 1, wherein the autocorrelation detection sensor is an array of detectors and the focusing element is a lenslet array, such that the array of detectors measures local tip/tilt and higher order aberration effects.

16. The wavefront sensing system of claim 1, wherein the focusing element is aligned so the central peak of light intensity will fall at the center of the autocorrelation detection sensor when there is no difference between the reference image and a real-time image passing through the updateable display element.

17. The system of claim 1, in combination with at least one of a telemetry system, a system for measuring wind effects, a system for dynamic scanning of exit pupils, a still camera stabilization system, a movie or film camera stabilization system, a hand-held video camera stabilization system, image stabilized binoculars, an image-stabilized riflescope, an image-stabilized cell phone camera, an image-stabilized range finder, an image-stabilized telescope, a stabilized shipboard optical system, a stabilized shipboard periscope, an automated threat detection system, a target tracking system, a missile tracking system, a target identification system, a missile identification system, an air to air missile, an air to ground missile, a ground to air missile, a ground to space missile, an air to space missile, a space to air missile, a space to ground missile, a smart robotics system, a sub-aquatic remotely operated vehicle, a torpedo, and an intelligence gathering system.

18. A method for measuring tip/tilt of an optical wavefront passing through an aberration medium, the method comprising:

receiving the optical wavefront at an optical system;

transmitting the optical wavefront to updateable display element;

sampling a snapshot of the optical wavefront;

modulating the optical wavefront passing through the updateable display element with a reference image representing the snapshot of the optical energy; focusing the modulated optical wavefront onto a autocorrelation detection sensor; and measuring, with the autocorrelation detection sensor, a change in centroid position of the focused optical energy, the change in change in a centroid position corresponding to a change of the tip/tilt in the optical path.

19. The method of claim 18, wherein the updateable display element is a spatial light modulator.

20. The method of claim 18, wherein the updateable display element is a micro minor array.

21. The method of claim 18, further comprising:

transmitting the measurement of the centroid position to an adaptive optics system for correction of the optical wavefront.

22. The method of claim 18, wherein the adaptive optics system includes a beam steering element and/or a wavefront correction element.

* * * * *